United States Patent [19]

Postlewait et al.

[11] Patent Number: 6,093,915

[45] Date of Patent: Jul. 25, 2000

[54] MAGNET AND REED SWITCH/LOCK

[75] Inventors: Lester Buck Postlewait; Paul Louis Urban, both of Cheraw, S.C.

[73] Assignee: Cooper Industries, Inc., Houston, Tex.

[21] Appl. No.: 09/253,251

[22] Filed: Feb. 19, 1999

[51] Int. Cl.$^7$ .................................................. H05B 1/02
[52] U.S. Cl. .............................................. 219/494; 219/230
[58] Field of Search ..................................... 219/494, 230, 219/240, 241, 238, 507, 518, 497; 392/476, 409; 228/9, 177

[56] References Cited

U.S. PATENT DOCUMENTS

| | | | |
|---|---|---|---|
| 4,766,289 | 8/1988 | Santoro et al. | 219/235 |
| 5,054,106 | 10/1991 | Fortune | 392/476 |
| 5,380,982 | 1/1995 | Fortune | 219/230 |
| 5,483,040 | 1/1996 | Fortune | 219/230 |

Primary Examiner—Teresa Walberg
Assistant Examiner—Quang Van
Attorney, Agent, or Firm—Coats & Bennet, P.L.L.C.

[57] ABSTRACT

This disclosure sets out a soldering wand control system. With a wand having a heated tip, a heater element and a thermostat for measuring tip temperature, an output signal of tip temperature is provided. Using an analog to digital converter, tip temperature is transmitted to a CPU along with a set point temperature. The CPU also connects with a binary switch which is toggled to input an operator generated signal for changing tip temperature. In the preferred form, the binary switch is a reed switch which is physically mounted for easy operation by an operator moved magnet. This enables easy input of a binary signal for changing the circuit and its operation. In one form, the binary switch is a reed switch mounted on a printed circuit board within the cabinet and is magnetically sensitive by virtue of an external magnet which causes operation.

9 Claims, 3 Drawing Sheets

MAGNET AND REED SWITCH/LOCK

BACKGROUND OF THE DISCLOSURE

This disclosure is directed to a solder control system, and more particularly to a solder control system which enables the operator to make periodic adjustments in the operation of the solder control system. It is especially helpful in controlled repair of a printed circuit board (PCB) having a number of components mounted on it. It protects in the event the components on the PCB may be heat sensitive. It also protects in levels applied can be adjusted. Different heat levels are necessary so that occasional cold solder joints can be simply reheated to convert into a high quality connection. But, in other instances, a greater heat level is mandated because it is necessary to melt to make the electromechanical connection necessary when installing components on the PCB. Consider a manufacturing plant which processes several PCB's per minute, each passing through a series of machines which install (or stuff) the components on the PCB. The components typically will include transistors which are commonly in the form of integrated circuit components (IC) and will also include connectors, and individual circuit components such as resistors or inductors. While some are normally less sensitive to heat, there are some capacitors which are heat sensitive. While the measurement of the capacitor can increase with dielectric materials now available, such materials are in fact very touchy to heat that is applied to them. They can be damaged by the application of excessive heat.

Alternately, while the solder tip may be maintained at the right temperature, if it is applied for too long an interval, damage may result. These are factors that have to be taken into account at the time of repairing any of the PCB's which are sent to quality control (QC) and which fail the QC tests. Consider for instance a plant that manufactures 1,000 copies of a PCB per hour. A certain percentage of those will be sent back after QC testing for repairs. At this stage of production, the handful which need repairs will be further tested and the nature of the repair can then be determined. Typically, the repairs will fall into three or four categories. For one, they will either be a cold solder joint or an open solder connection. Both require resoldering. For another, an installed component may fail, thereby suggesting that component be removed by hand and a replacement for it then installed. The replacement component has to be soldered to the PCB. Rework of this sort after QC testing is relatively straight forward, but it is dependent on and subject to the QC tests and then the repair procedure. All the foregoing requires the use of a solder tip, sometimes known as a solder gun or solder iron. Whether large or small, these have the form of a handheld wand of relatively light weight. It is kept at an elevated temperature so that there is little delay in the use of the soldering tool. Nevertheless, while it is held steadily at some temperature, it may not be the right temperature to solve each and every problem that can arise with a given PCB. In the repair step, the PCB is thus tested, the flaw is identified, and the soldering tool is then used to implement the repairs. In some instances, the repairs can be done all at a common temperature. In other instances, it may require an adjustment.

The soldering tool is adjustable to a range of temperatures. Normally, a selected temperature is required for a given situation, often dependent on the type of solder used, PCB thickness, wire gauge, maximum rating of components, required product ruggedness, and so on. These variables manifest a selected temperature for QC repair selected by a process engineer or repair line supervisor. This decision is often taken from the repair staff to assure that the repair is not too hot or cold as will be exemplified below.

The present disclosure is directed to a control system which easily mechanizes the control of the tool tip temperature. This is important so that the operator need not make an analog adjustment every time a soldering operation is made. The present disclosure is directed to a controller which includes a microprocessor (CPU) cooperative with analog to digital converter (ADC) so that measurements are taken continuously of the tip temperature. The tip temperature is maintained at a set point. One aspect of control is erroneous setting of the temperature. The operator may operate by eye, that is, the joint looks good because the metal did melt and flow. This fails when a cold solder joint is made. Another problem occurs when the joint is over heated. Heat may flow up the wire into a capacitor and damage the dielectric in the capacitor. This damage, like others, will not be observed until testing, or perhaps some time later. Generally, it is better that the solder tool tip temperature be locked at some temperature selected by specification, bypassing local control. Local, or operator control will not assure repeated consistent repair. Commonly available equipment utilizes an adjustable temperature potentiometer which is adjusted to provide any desired temperature. That, however, is tedious if required for every use of the device. Typically, the situation is somewhat simplified in that most of the solder repairs occur at a common temperature. The tip temperature should be elevated or reduced only rarely. Different repair stations can be used for the more heat sensitive components installed on the PCB. Or, higher temperatures are needed for large metal members, e.g., a plug or socket on the PCB. For that reason, a second temperature from a different solder tool is needed. Rather than reset, or adjust a rotary knob or dial and then wait for one tool to stabilize at the right temperature, there being some inertia in shifting from one to another temperature, the present disclosure contemplates a programmed control system which is adjusted to a first temperature while a second temperature is provided at a second unit. Since these two temperatures are different, each device goes on further to include a simple binary switch which is just toggled easily from one to the other position, thereby locking out operator interference with the control. The appropriate determination of the voltage level is applied to the solder tip, and calibration with respect to that voltage (hence temperature) enables the desired temperature to be achieved and locked. More than that, hand readjustment is defeated. The operator simply cannot select other temperatures while doing the repairs. One temperature is the sole temperature setting and it is locked by the system. If needed, that can be overridden. The present disclosure sets out the equipment for overriding the first setting. By overriding, supervisor control is then achieved. The supervisor selected temperature, the one essential for repairing, is executed by operation of the simple binary switch and locked into the control system.

The present disclosure sets out a binary switch which is hidden within the cabinet of the solder tip temperature control system. This cabinet encloses an internal PCB for mounting all the components necessary for its operation. The PCB supports a reed switch. The reed switch responds to an external magnetic field and thereby enables hand override without requiring more complicated transactions than that. Easily, a simple motion with a magnet will render the control operative in a different mode to accomplish a different temperature. These temperatures can be preprogrammed and started so that there is no need to undertake further activities to get to the temperatures desired. Then with the right temperatures achieved, the soldering equipment can be used to accomplish the desired repairs. The repair line supervisor is equipped with a wand or pocket carried implement, similar to a long pencil or other clip mounted device have a special strength magnet in it. The magnet is moved toward and away from a selected cabinet area to operate a reed switch. The switch is toggled to override the initial operative state and switch to another state, all for the purpose of proper device calibration and setting.

SUMMARY OF THE PRESENT DISCLOSURE

This disclosure is summarized as setting forth a wand shaped handle mounting a soldering tip. It has an incorporated heater element with a thermostat. A feedback loop is established where a signal is formed indicative of tip temperature. There is a control box which is connected with a multiple conduit cable extending to the soldering wand. The wand is easily moved while the box or cabinet which is attached to it need not move much. The system utilizes a thermostat controlled electrical power delivery circuit so that the tip is heated. It includes a central processing unit (CPU) which operates with a memory. The device is adjusted to a specified temperature by means of an adjustable potentiometer. In addition to that, it is constructed with a hidden reed switch which is magnetically responsive for operation. Using a plastic cabinet, the reed switch is buried inside the cabinet to respond to a magnet on the exterior. Many metals will pass some measure of magnetic field. Preferably, the cabinet is not made of ferrous metal so that the switch on the interior of the cabinet will respond to the stimulus of the magnetic field. The reed switch is activated from time to time by the operator in accordance with some routine stored in the system. When the routine is executed, an output signal is formed on a light emitting diode (LED) which provides the necessary signal to the operator about the transaction or event that just occurred. That signal will also be helpful to avoid interruption of regular operation.

DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
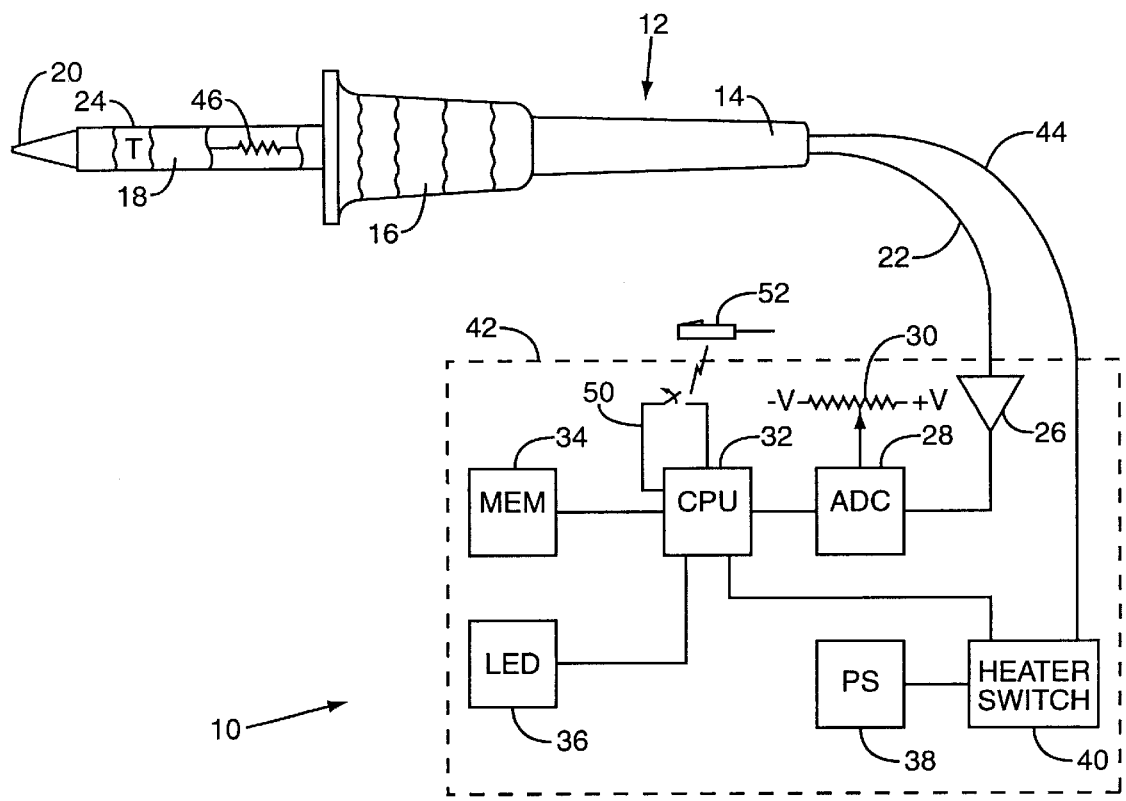
FIG. 1 is a view of the wand incorporating a soldering tip, thermostat and heater element which are all connected by a cord to a control box wherein the control box includes an embedded and unseen reed switch.

Attention is now directed to FIG. 1 of the drawings where the numeral 10 identifies the solder control system of the present disclosure. It is best understood by starting with the wand 12 which includes a handle 14 for easy use by the operator, and an enlarged and fatter region handle 16. That region defines a grip for easy operator use so that the wand 12 can be moved to the desired location. A mounting shaft 18 supports a tip 20 which is heated to some desired level. There is a heater element in the wand and there is also the thermostat 24. The thermostat 24 measures the temperature of the tip 20 and provides a thermostat output signal. The output signal from the thermostat is delivered over a signal conductor 22. Electric heat is generated by the heater element and is applied to the tip 20. The tip is raised or lowered in temperature. The thermostat responds to this to form the signal output on the conductor 22. The signal is indicative of actual temperature at the tip. The temperature signal is output on the conductor 22 to an operational amplifier 26 which provides buffering. The amplifier 26 forms an output signal applied to an analog to digital converter (ADC). The ADC 28 is provided with a variable signal controlled by a potentiometer 30. The potentiometer 30 has two end connections which are connected to suitable bias voltage levels which are typically about 5 volts apart. One can be ground and the others can be positive or negative. It is adjustable so that the wiper terminal of the variable resistor 30 forms an output signal applied to the ADC 28. The ADC is thus provided with a signal indicative of actual temperature at the tip 20 and is also provided with a set point from the adjustable resistor 30. The two voltages are multiplexed for the ADC.

The two voltages are converted into suitable digital signals which are input to the CPU 32. The CPU 32 provides control of the system. It provides an output signal for the visual display which includes the light emitting diode (LED) 36. The LED provides a signal which will be exemplified later. This visual signal is provided for the operator.

The system shown in FIG. 1 also includes a memory 34 which stores the program of interest. This program controls operation of the system.

Going now to device construction, all the equipment described and set forth above is located in a cabinet or housing 42. It has a power cord normally connected to a commercial power source. This delivers current flow to the power supply (PS) 38. The PS provides suitable voltage levels for operation of all the components. In one aspect, the PS provides an output current flow to a heater switch 40. The heater switch 40 is operated in accordance with the signals sent to it for its operation from the CPU. The heater switch changes the current level. The output of the heater switch on the conductor 44 is input to the heater which is inside or integrally constructed (out of sight) within the wand. For sake of description, FIG. 1 shows a heater element 46 which is provided with electrical power over the line 44. It is heated by the current flow, thereby resulting in a controlled temperature increase at the tip 20. Tip temperature is monitored at all points in time. The monitoring is done by the thermostat 24 which is connected through the conductor 22 to the amplifier 26.

The present disclosure contemplates the installation of a reed switch 50 inside the cabinet or housing 42. The reed switch is located for movable magnet operation. The reed switch 50 is shown in FIG. 1 spaced opposite a small pocket magnet wand 52 which has a magnetic body. It is moved close to the cabinet 42 and magnetically interacts with the reed switch 50 on the inside of the cabinet as will be detailed below. This causes a change in operation as will be explained.

Figure 2:
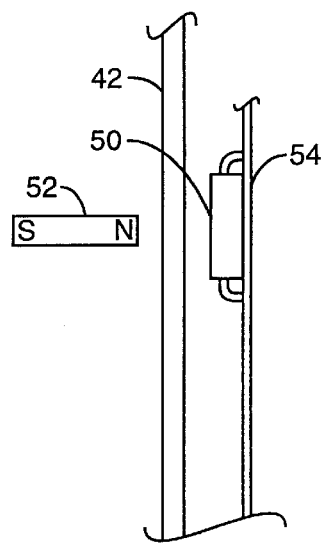
FIG. 2 is a sectional view through the device showing a reed switch mounted at an internal location yet which is responsive to and operated by an external magnet.

To get a better view of this, go momentarily to FIG. 2 of the drawings. This shows an internal PCB 54 which supports the reed switch 50. The switch 50 is located below the skin or shell 42 which is preferably made of a nonmagnetic material. It can be plastic or other composite materials.

Figure 3:
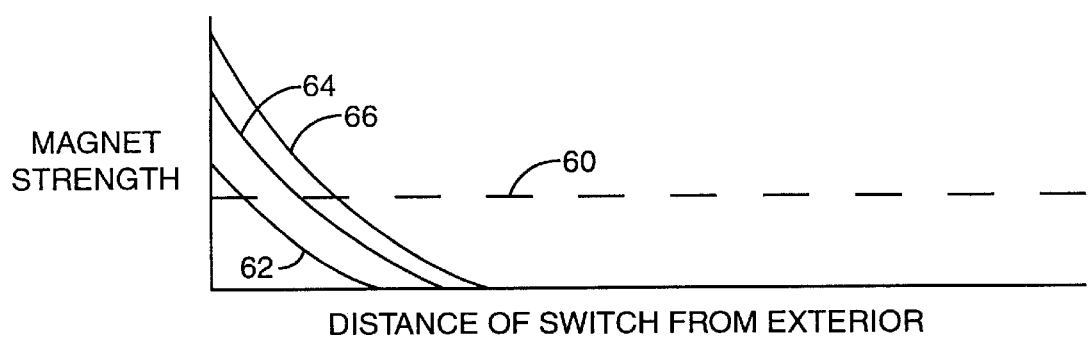
FIG. 3 is a graph of magnet strength and distance to enable operation.

Even if made of aluminum, magnetic flux will pass through the cabinet or housing. To this end, a magnet 52 is shown on the exterior. The magnet co-acts with the reed switch to operate the switch. When it is operated, a momentary signal is formed. It is not necessary to hold the magnet next to the reed switch for a long time. The response of the system will be exemplified in the simple examples which are set out below at FIGS. 3 and 4. These examples will discuss the interaction of the variable setting 30 which is adjusted to some temperature, the reed switch 50, and the signals which are flashed or otherwise indicated by the LED 36.

Consider an operation where the tip 20 is first cold and turned on for operation at some common temperature. The present system can operate readily to do this for repair of a PCB which has been rejected by the QC testing, etc. Initially, the potentiometer 30 is adjusted to some setting which is input as a signal to the ADC 28, and that in turn is applied to the CPU. The CPU is also provided with control of the heater switch 40. By suitable adjustment of the voltage at 30 and by suitable operation of the heater switch 40 through the CPU 32, the heater 46 is heated to greater or lesser levels, thereby bringing the tip 20 the desired temperature as measured by the thermostat 24. The signal is output from the thermostat 24 through the buffer amplifier 26 and is converted into an appropriate signal by the ADC 28. The tip stabilizes at the desired level. Once the tip is heated to the desired temperature, then the potentiometer 30 is best disconnected. It is the temperature locked in so the operator will not move up or down. This system effectively overrides operator control; this is done by inputting a signal to the CPU 32 to recognize the potentiometer signal to calibrate the tip 20 and then to disconnect the potentiometer until another signal is input to enable dial control and possible adjustment.

As an example, assume that the memory is loaded with a code responsive to a series of long and short pulses. The magnet 52 is moved near a part of the cabinet 42 to form a signal by magnet attraction. The magnet 52 must have a certain strength to achieve switch closure. Assume that there are some solder joints which must be resoldered from time to time. These might need a temperature $T_1$ or $T_2$ which is 20 degrees lower. The memory 34 has been loaded to store the set temperature level. It is stored in each solder tool control system, as appropriate. The setting for the desired temperature $T_1$ or $T_2$ or $T_3$ is implemented only by control through the reed switch 50. When the QC test locates a repair job which requires a reduced temperature, the reduced temperature is implemented by prior control of the several solder tool systems 10 by momentarily waving the magnet wand 52 (the body being a magnet) close to the appropriate spot on the face of the panel or cabinet 42.

The magnet 52 is shown in near proximity (see FIG. 3) of the reed switch in FIG. 2. When it passes by that, the reed switch is toggled and forms a signal, see FIG. 4. By appropriate operation of the CPU, the memory is opened to store a new temperature setting via the potentiometer. This temperature setting is then in the memory for the CPU. That in turn changes the output or control signal for the heater switch 40. The amount of current delivered by the power supply to the heater 40 is then adjusted to assure the desired $T_1$ or $T_2$. That controls the amount of heat liberated at the heater element 46, and temperature is tracked by the thermostat 24. When the thermostat is at the designated and calibrated temperature (really it is a temperature band because of the tolerance), then the temperature indicator signals the operator by LED flashing, blinking, or changing color. The signal from the LED is observed. The signal at the LED prompts the operator that the temperature is correct. In other words, the LED signals that the device is ready to operate. Consider as an example that the LED provides a blinking or color change symbol. In any selected mode of operation, the necessary temperature set point is signalled. When the tip temperature is off its assigned set point, an appropriate signal for this is indicated.

Operation of the device thus measures the temperature at the tip and uses this to control the heater switch 40. The amount of electrical current is changed to restore the temperature. When the desired temperature is achieved, the LED gives a signal to the operator that it can then be properly used. The LED can be numeric in operation, or it can be an off/on signal. Another choice is to use red and green lights and to provide control flashing or blinking for them.

Figure 4:
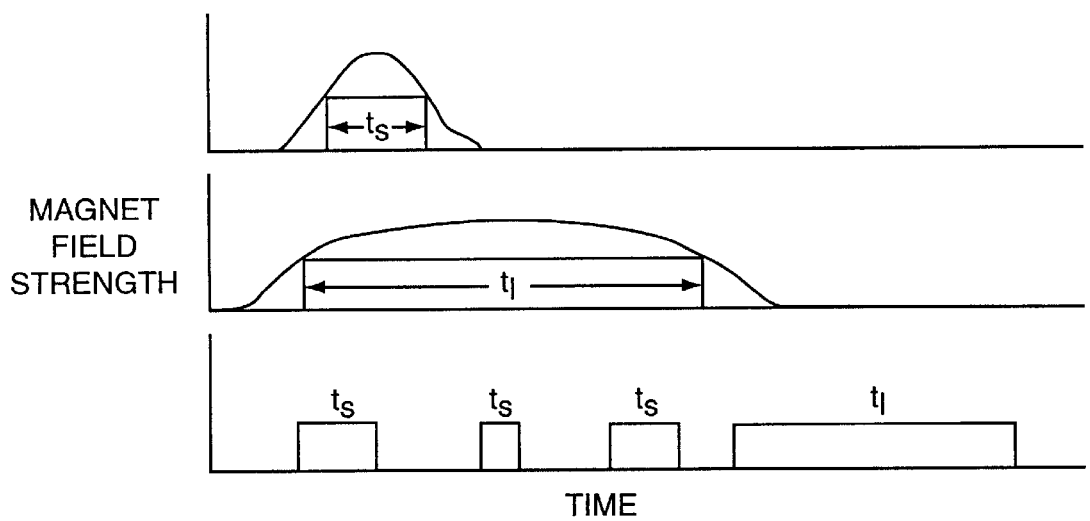
FIG. 4 is a graph of magnet signals to control operation.

The system has another advantage. The magnet 52, if too weak, does not even act on the switch. This means the magnet does not impose a field in excess of the intensity level 60 on the switch 50. In other words, nothing happens at the switch 50 because the field is too weak. But the curves 62, 64, and 66 are field strengths greater than the level 60 and impose enough strength on the reed switch 50 to trigger operation. The field strength level 60, being exceeded by the curves 62, 64, and 66, is great enough to create a switch closure. When the switch 50 operates, it is in response to magnetic attraction above the level 60. The magnet 52 is moved close to the cabinet to cause a switch operation, a binary event shown in FIG. 4. The curve of field strength over time in FIG. 4 shows how the variable field is converted to a short binary signal, see the symbol $t_s$. While the precise duration can vary, the short signal of $t_s$ is defined as anything within a stated time range, say 10 to 500 milliseconds while a longer closure of about 1,200 to 3,000 milliseconds can be denoted as the longer signal or shown in FIG. 4. The two ranges ($t_s$ and $t_1$) can be set at two arbitrary possible ranges, and they are separated by some arbitrary spacing. By spacing, it is suggested that the two ranges differ by a notable spacing to avoid overlap and uncertainty in the data.

Figure 5:
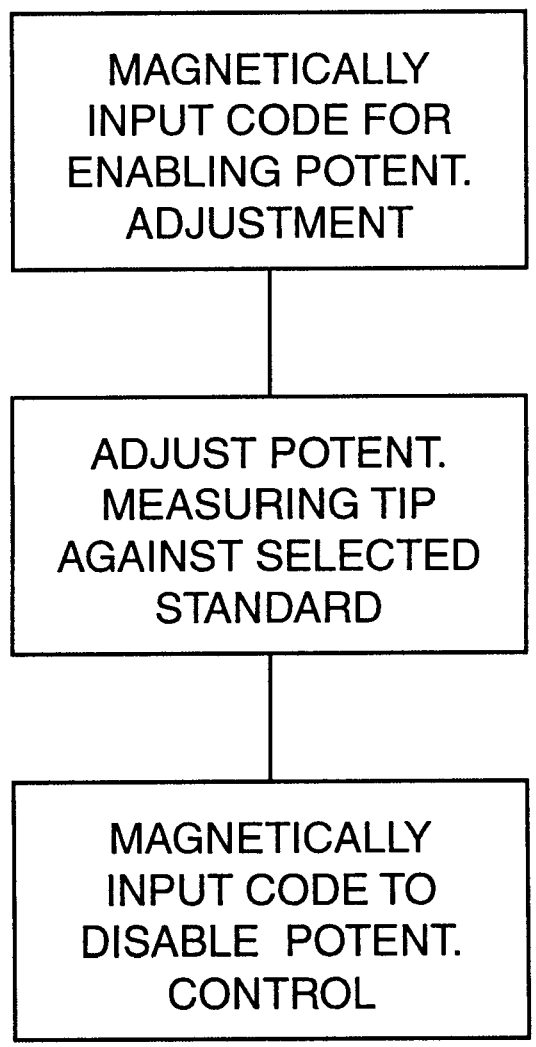
FIG. 5 is a block diagram flow chart of a control program.

FIG. 4 shows a series of three $t_s$ and one $t_1$ signals, a unique pulse pattern. This pattern exemplifies the input of a dedication signature for a selected control system 10. The other identical control systems 10 are all provided with their different or common pulse patterns to lock or unlock operation. For example, assume that 25 units make up a repair facility. For a given mass production QC repair cycle, assume that 23 are needed at one temperature ($T_1$) while one is cooler by 10° and another is hotter by 10°, hence, settings of $T_2$ and $T_3$. Assume each of the 25 has its own unique symbol made of long and short pulses to connect the potentiometer 30. Assume a second symbol input to the system disconnects the potentiometer 30. Consider the following sequence. The magnet wand 52 is positioned at the desired location to encode the symbols for each of the 25 to enable the CPU to operate. This, then enables hand control of each system by rotation of the potentiometer 30. Each is adjusted to a calibrated temperature selected by the line supervisor meaning 23 are adjusted so the tip 20 is set to $T_1$ while two units are set to $T_2$ or $T_3$. These settings are achieved by enabling and then disabling control via the potentiometer. All the foregoing actions require inputting the necessary assigned memory code to enable the potentiometer, then set the temperature against some reference, and finally disabling the potentiometer as shown in the flow chart of FIG. 5.

While the foregoing is directed to preferred embodiment, the scope thereof is determined by the claim which follow:

What is claimed is:

1. A control system for regulation of operation of a soldering tool having a heater element and a thermostat therein, wherein the soldering tool control system comprises:
   (a) a heater switch connecting an electrical power supply to the soldering tool for controlling the current flowing to the heater element;
   (b) a control circuit for controlling the heater switch to maintain the temperature of the soldering tool at a predetermined temperature;
   (c) a temperature control for inputting the predetermined temperature to the control circuit; and
   (d) a toggle switch actuated by an externally applied magnetic force for providing an input signal to the control circuit wherein the control circuit is responsive to the input signal from the toggle switch to enable and disable the temperature control.

2. The apparatus of claim 1 further including a cabinet enclosing the heater switch, the control circuit, and the toggle switch.

3. The apparatus of claim 1 wherein the soldering tool includes a thermostat providing a feedback signal to the control unit indicative of soldering tool temperature.

4. The apparatus of claim 2 wherein the soldering tool comprises a handheld, remotely operated and remotely positioned soldering tool on an extended cable and supports a soldering tip thermostat and heater for heating the soldering tip.

5. The apparatus of claim 4 wherein said cabinet is formed of a material permitting a magnetic field to extend therethrough.

6. The apparatus of claim 1 wherein said toggle switch is a reed switch.

7. The apparatus of claim 1 including a memory for storing said predetermined temperature.

8. A method for controlling the operating temperature of a soldering tool to prevent tampering comprising:
   (a) providing a control circuit for controlling the operating temperature of the soldering tool, said control circuit including a temperature control and a control switch actuated by an externally applied magnetic force for enabling and disabling said temperature control;
   (b) enabling said temperature control by actuating said control switch with an externally applied magnetic force;
   (c) setting the operating temperature of the soldering iron while the temperature control is enabled; and
   (d) disabling said temperature control by actuating said control switch with an externally applied magnetic force.

9. A control system for an electric soldering tool having a heater and thermostat therein, wherein the control system comprises:
   a) a cabinet;
   b) a heater switch mounted in said cabinet for regulating current flowing to said soldering tool;
   b) a control circuit mounted in said cabinet for generating an output signal to control said heater switch so as to maintain the soldering tool temperature at a predetermined temperature;
   c) a temperature control mounted to said cabinet for setting said predetermined temperature; and
   d) an externally controlled toggle switch mounted in said cabinet and actuated by a externally applied magnetic force for enabling and disabling said temperature control.

* * * * *